United States Patent [19]
Rohlfs

[11] 3,866,309
[45] Feb. 18, 1975

[54] APPARATUS FOR MACHINING CHUCK JAW ELEMENTS

[75] Inventor: John H. Rohlfs, Torrington, Conn.

[73] Assignee: Jamieson Manufacturing Company, Torrington, Conn.

[22] Filed: Jan. 28, 1974

[21] Appl. No.: 436,960

[52] U.S. Cl...................... 29/563, 29/564, 29/33 R, 90/11 R, 90/79, 90/87, 90/56 R
[51] Int. Cl........................... B23q 7/00, B23p 23/00
[58] Field of Search.................... 29/33 R, 563, 564; 90/11 R, 63, 87, 79, 56 R

[56] References Cited
UNITED STATES PATENTS
3,241,231  3/1966  Andersen............................ 29/563

*Primary Examiner*—Gil Weidenfeld
*Attorney, Agent, or Firm*—McCormick, Paulding & Huber

[57] ABSTRACT

Apparatus for machining intersecting angularly related flats and a thread segment on chuck jaw elements. A hopper holds a plurality of workpieces and an associated delivery tube transfers the workpieces in end-to-end sequential relationship to an escapement mechanism at a first work station. At the work station, a slidably movable workholder receives the workpieces at a first position and supports the same for machining of the flats by a reciprocable broaching tool. The holder is thereupon slidably moved to a second position at a second work station and the workpiece is ejected from said first work holder to a rotary second workholder. A milling cutter at the second work station cuts a thread segment in the workpiece whereby to complete the chuck jaw element and the element is thereafter ejected from the workholder.

11 Claims, 14 Drawing Figures

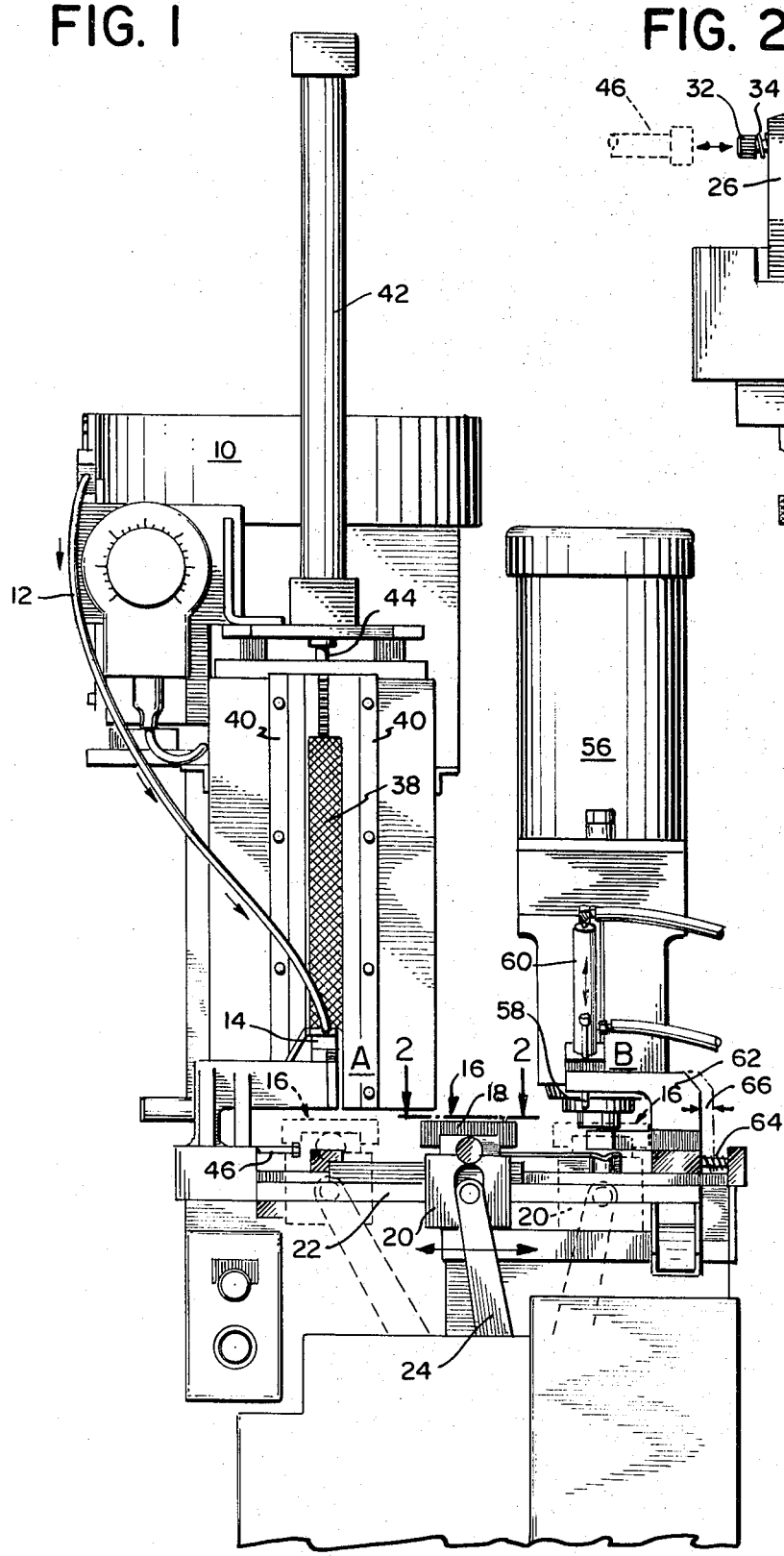

PATENTED FEB 18 1975 3,866,309
SHEET 2 OF 2
FIG. 5A  FIG. 6A          FIG. 7A
            
FIG. 5   FIG. 6   FIG. 6B
     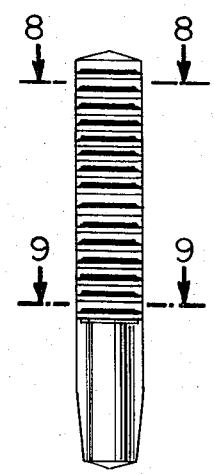
FIG. 7   FIG. 7B
FIG. 3
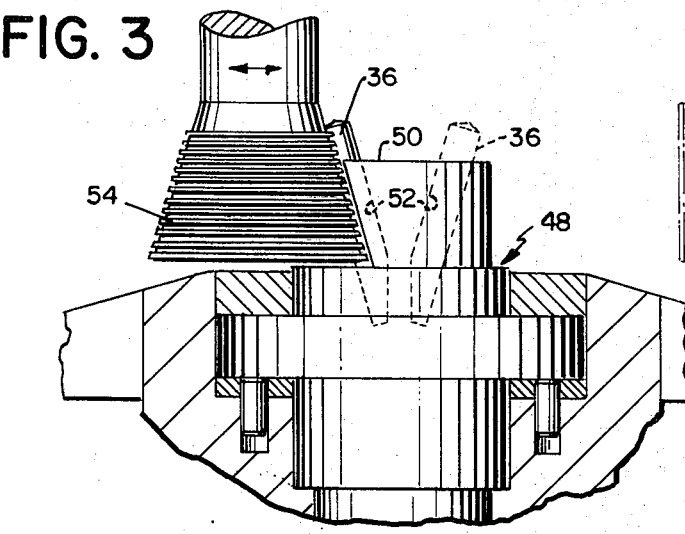
FIG. 4
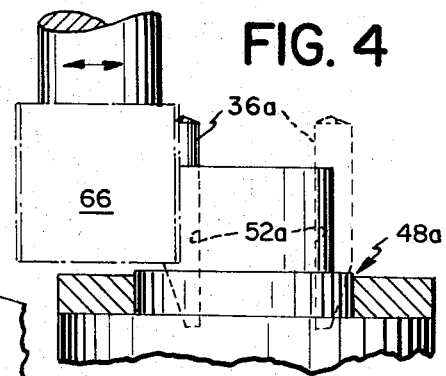

3,866,309

APPARATUS FOR MACHINING CHUCK JAW ELEMENTS

BACKGROUND OF THE INVENTION

Apparatus for machining chuck jaw elements of the type accommodated by the present invention has been available in the past, but a wholly automatic machining operation has not been achieved with such apparatus.

SUMMARY OF THE INVENTION

It is the general object of the present invention to provide apparatus for machining intersecting angular flats and a thread segment on a small cylindrical workpiece whereby to provide chuck jaw element, said apparatus being wholly automatic in its operation.

BRIEF DESCRIPTION OF THE DRAWINGS

FIG. 1 is a fragmentary vertical section showing the principal parts of the apparatus of the present invention.

FIG. 2 is a fragmentary horizontal section, taken generally as indicated at 2—2 in FIG. 1, and illustrating a movable first workholder included in the apparatus of the invention.

FIG. 3 is a fragmentary vertical section showing a second workholder and an associated milling cutter.

FIG. 4 is a fragmentary vertical section showing an alternative form of the second workholder and milling cutter of FIG. 3.

FIG. 5 is a side elevational view of a cylindrical workpiece prior to operation thereon by the apparatus of the present invention.

FIG. 5a is an end view of the workpiece of FIG. 5.

FIG. 6 is a side elevational view of the workpiece of FIG. 5 after the machining of intersecting flats thereon in the apparatus of the present invention.

FIG. 6a is an end view of the workpiece of FIG. 6.

FIG. 6b is a second side elevational view of the workpiece of FIG. 6 rotated through an angle of 90° from the position shown in FIG. 6.

FIG. 7 is a side elevational view of the workpiece of FIG. 6, after a subsequent machining operation in the apparatus of the present invention, that is, subsequent to a milling operation of the apparatus wherein a thread segment is provided on the workpiece.

FIG. 7a is an end view of the workpiece or completed jaw element of FIG. 7.

FIG. 7b is a second side elevational view of the workpiece of completed jaw element of FIG. 7, the element being rotated through an angle of 90° with respect to the position of FIG. 7.

FIG. 8 is a transverse section through the chuck jaw element of FIGS. 7, 7a and 7b, said view being taken approximately at the line 8a in FIG. 7b.

FIG. 9 is a second transverse sectional view similar to FIG. 8 but taken approximately at the line 9—9 in FIG. 7b.

DESCRIPTION OF PREFERRED EMBODIMENTS

Referring particularly to FIG. 1, it will be observed that the apparatus of the present invention comprises a hopper indicated generally at 10. The hopper 10 may vary widely in form and construction within the scope of the invention. Any of several well-known commercially available types of hoppers may be employed to deliver small cylindrical workpieces such as illustrated in FIGS. 5, 5a in succession to a transfer device in the form of a transfer tube 12. The transfer tube 12 extends downwardly from the hopper 10 to a first work station A and, more particularly, to an escapement mechanism 14. The escapement mechanism 14 may vary widely in form and said mechanism is adapted to deliver workpieces received from the tube 12 in end-to-end sequential relationship to a first workholder 16. The first workholder 16 is illustrated at a central or intermediate position in FIG. 1 in full-line form and is shown in broken line form at first and second or left and right-hand positions. The first and second or left and right-hand positions correspond with the aforementioned work station A and a second work station B at a right-hand portion of the apparatus. The workholder 16 is further illustrated in FIG. 2.

Referring to FIG. 2, an upper or body portion 18 of the workholder 16 is supported atop a slide 20, best illustrated in FIG. 1. The slide 20 is mounted on a guideway 22 extending from a left to a right-hand portion of the apparatus or machine and residing in a horizontal plane. The workholder 16 is thus slidably movable between the first and second work stations A and B and actuating means for moving the workholder may comprise a oscillable lever 24 movable in left and right-hand directions in suitably timed relationship with the operation of other elements of the apparatus at the work stations A and B.

Returning to FIG. 2, a workpiece clamping device, forming a part of the workholder 16 is illustrated with a fixed member 26 and a swingably movable member 28 pivoted at 30. The swingably movable member 28 is operated by a small reciprocable pin 32 spring biased at 34 to an outer or leftward position wherein the member 28 is in a clamping position. The member 28 when in a clamping position engages a workpiece such as a workpiece 36 illustrated in FIG. 2 and supports the same in a substantially upright but inclined position. That is, a workpiece such as 36 is supported by the workholder 16 with a lower portion thereof inclined rearwardly in the machine or apparatus so that said portion may be readily engaged and operated upon by a broaching tool 38.

The broaching tool 38 extends vertically in the machine or apparatus of the invention and is reciprocable in a guideway 40. Various means may be provided for operating the broaching tool, but in the presently preferred embodiment of the apparatus, a fluid cylinder 42 is mounted atop the machine or apparatus in a vertical position with a rod extending downwardly for connection with a rod 44 extending downwardly for connection with the broaching tool 38. As will be apparent, the cylinder 42 may be operated in timed relationship with the movement of the workholder 16 whereby to engage a lower end portion of the workpiece 36 held by the workholder, and to provide one or more flats thereon. The broaching tool shown is adapted to provide the intersecting flats of FIGS. 6 and 6b on a workpiece such as the workpiece 36.

In FIG. 2, there is illustrated in broken line form a small stop pin 46 which cooperates with the aforementioned pin 32 to provide for the suitable opening and closing operation of the member 28 of the workholder 16. That is, the pin 46, located as illustrated in FIG. 1, engages the pin 32 on leftward sliding movement of the workholder and causes the aforementioned clamping member 28 to open receiving a workpiece from the escapement mechanism 14. The member 28 thereupon clamps the member 36 in the position shown for operation thereon by the broaching tool 36. Thereafter, the workholder 16 is moved rightwardly from the work station A to the work station B.

At the work station B, the workholder 16 is disposed above a second workholder illustrated generally at 48 in FIG. 3. The workholder 48 has a rotary indexing member 50 provided with a workpiece receiving slot 52. The workpiece receiving slot 52 extends in a substantially upright direction, but with its vertical center line inclined slightly from the vertical in FIG. 3. That is, a workpiece 36 in the slot 52 has its axis inclined from the vertical as illustrated in FIG. 3 to provide for cutting of thread segments therein substantially at an angle and at approximately the position to be occupied by a chuck jaw element in operation in a chuck. Thus, a cone-shaped milling cutter 54 is provided and the cutter is of course, adapted for rotation in the usual manner as by means of a drive motor 56, FIG. 1. Further, the cutter is movable forwardly and rearwardly in the machine or apparatus whereby to engage a workpiece 36 as illustrated in FIG. 3.

In order to remove a workpiece 36, from the holder 16 and to insert the same in the holder 48, an ejecting device is provided in the form of an ejecting pin 58, best illustrated in FIG. 1. The ejecting pin 58 has an associated fluid operated cylinder 60 for actuating the same in timed relationship with the movement of the aforementioned workholder 16. Thus, when the workholder 16 is at the station B beneath the pin 58, the pin is urged downwardly by the fluid operated cylinder 60 whereby to eject a workpiece 36 from the holder and to insert the same in the slot 52 in the holder.

Returning now to FIG. 3, it will be observed that the right-hand workpiece 36 is shown in broken line form and it will be understood that this represents the position of the slot 52 when a workpiece 36 is received therein. That is, the slot 52 is disposed beneath the workholder 16 through rotary indexing operation of the workholder 48.

Preferably, and as illustrated, the machine and apparatus of the present invention is adapted for a continuous rotary indexing movement of the workholder 48. Thus, a workpiece 36 is received in the slot 52 with the member 50 in motion and the member continues in its rotation whereby to pass the workpiece into and through engagement with the milling cutter 54, the workpiece being thereafter ejected from the holder in a finished condition. In order to facilitate and to enhance the efficiency of the transfer of workpieces from the first and to the second workholders 16, 48, the ejecting pin 58 and its operating cylinder 60 are preferably mounted on a frame member 62 which is adapted for limited horizontal movement. As best illustrated in FIG. 1, the frame 52 has a spring bias at 64 and is movable over the limited horizontal dimension 66. Thus, as a workholder 16 moves rightwardly to station B, the limited horizontal movement of the pin 58 above the workholder can be synchronized with the movement of the workholder and the movement of the second workholder 48 beneath the workholder 16 whereby to efficiently eject workpieces 36 from the holder 16 and to insert the same in holder 48. Thereafter, on rotation of the workholder 48, the thread segment is milled in the workpieces as mentioned above.

The concept of presenting the milling cutter to a chuck jaw element with the latter held with itx axis inclined from the vertical is in accordance with prior practice, and generally satisfactory results are achieved. However, there are disadvantages in the configuration of the finished chuck jaw element and it will be obvious that a cone-shaped milling cutter such as 54 is a relatively expensive tool.

Referring to FIGS. 8 and 9, it will be observed that the radius at the thread segment varys substantially from one end of a chuck jaw element to another, this being readily apparent from the cone-shaped cutter and inclined axis arrangement of FIG. 3. Such a variation in radius is undesirable in the operation of chuck jaw element in a finished chuck, and is avoided in the alternative arrangement of FIG. 4.

As will be observed, a conventional cylindrical milling cutter 66 is provided in FIG. 4. Further, the workholder 48a, similar to the workholder 48, has a slot 52a which receives and holds a workpiece 36a with its axis precisely aligned with the vertical. Operation of the workholder and the cutter are otherwise identical with that described for the arrangement of FIG. 3 and it will be apparent that a thread segment is provided on a workpiece 36a with a constant radius from one end of the workpiece or finished jaw element to the other. Workpieces or completed chuck jaw elements such as 36a, provided with the FIG. 4 arrangement are found to have a highly desirable configuration and the milling cutter 66 may of course be provided at economic advantage.

From the foregoing, it will be apparent that a wholly automatic apparatus has been provided for first broaching the intersecting flats of a chuck jaw element and thereafter milling a thread segment. The machine or apparatus is of desirably simple construction, exhibits a high degree of efficiency in operation, and may be manufactured at economic advantage.

I claim:

1. Apparatus for machining at least one angular flat and a thread segment on a small cylindrical work piece whereby to provide a chuck jaw element; said apparatus comprising, a hopper for holding a plurality of cylindrical work pieces, a transfer device associated with said hopper and adapted sequentially to deliver said cylindrical work pieces to a first work station removed from said hopper, an escapement mechanism at said first work station, a first work holder movable between first and second positions the former of which is at said first work station, said work holder and escapement mechanism cooperating at said first work station sequentially to transfer cylindrical work pieces from said transfer device to said movable work holder, a broaching tool movable in one and an opposite direction at said first work station for sequentially machining said flats on cylindrical work pieces held at said station by said work holder, a milling cutter disposed at a second work station removed from said first work station, a second work holder at said second work station, means for moving said first work holder between its said first and second positions, the latter positioned being at said second work station, and means for transferring said cylindrical work pieces sequentially from said first work holder to said second work holder at said second work station for milling threads in said work piece whereby to complete said chuck jaw element.

2. Apparatus for machining a chuck jaw element as set forth in claim 1 wherein:
said milling cutter has a generally frustoconical shape,
and wherein said second tool holder presents the cylindrical work piece to the cutter with its axis substantially parallel to the cutter surface and in a plane in common with the axis of the cutter.

3. Apparatus for machining a chuck jaw element as set forth in claim 1 wherein:
said milling cutter has a cylindrical configuration,
and wherein said second tool holder presents said cylindrical work piece to the cutter with its axis parallel to the cutter axis.

4. Apparatus for machining a chuck jaw element as set forth in claim 1 wherein:
said chuck jaw element requires first and second angularly related flats,
and wherein said broaching tool is shaped to provide said flats in a single stroke in said one direction.

5. Apparatus for machining a chuck jaw element as set forth in claim 4 wherein:
a fluid operated cylinder is provided for moving said broaching tool in said one and opposite directions.

6. Apparatus for machining a chuck jaw element as set forth in claim 1 wherein:
said hopper is mounted above said first work station,
and wherein said transfer device comprises a conduit carrying said cylindrical devices in end-to-end sequential relationship to said escapement mechanism.

7. Apparatus for machining a chuck jaw element as set forth in claim 1 wherein:
said first work holder comprises a slide mounted upon a longitudinal guideway extending between said first and second work stations,
and wherein said slide has an oscillable arm attached thereto for movement of the same between said first and second positions.

8. Apparatus for machining a chuck jaw element as set forth in claim 1 wherein:
said second work holder is mounted for rotation at said second work station,
said holder having a loading position where a cylindrical work piece is introduced thereto as aforesaid and an operating station where said work piece is passed through engagement with said milling cutter by rotary movement of said holder.

9. Apparatus for machining a chuck jaw element as set forth in claim 8 wherein:
said means for transferring work pieces from said first work holder to said second work holder comprises a fluid operated cylinder with a plunger adapted to engage work pieces in said first work holder and eject the same from said work holder to said second work holder.

10. Apparatus for machining a chuck jaw element as set forth in claim 9 wherein:
said cylinder and plunger are mounted for limited movement in unison with said first work holder to enhance efficiency of ejection of work pieces from said work holder.

11. Apparatus for machining a chuck jaw element as set forth in claim 10 wherein:
said first work holder comprises a clamping device spring biased to a closed position and having an opening pin thereon engageable with a suitable abutment for opening operation of the clamping device.

* * * * *